July 30, 1963  J. SCHEIB, JR  3,099,728
ELECTRICAL MULTIPOLE CONTROL RELAYS
Filed June 11, 1958  5 Sheets-Sheet 1
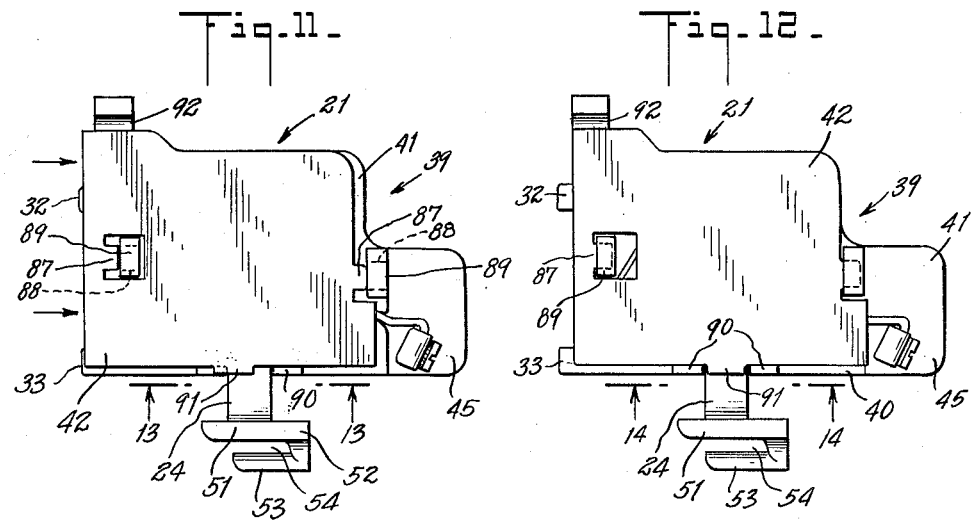
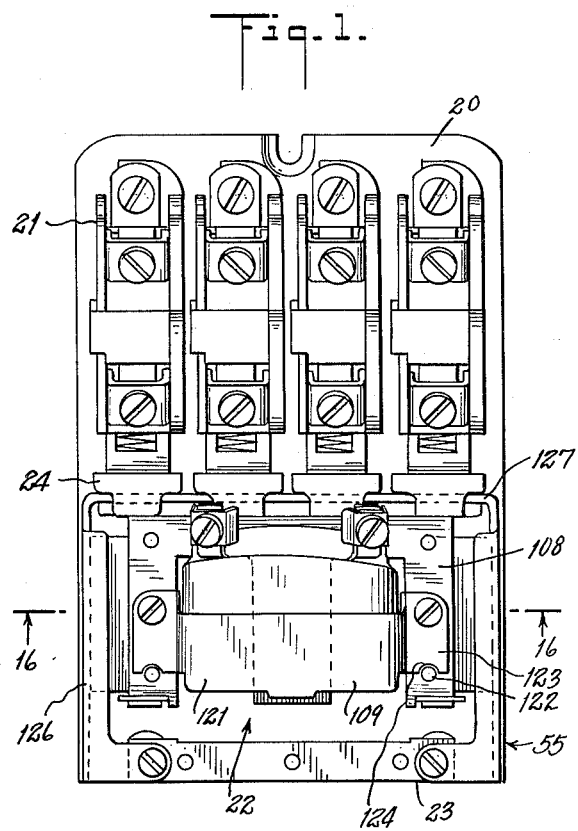
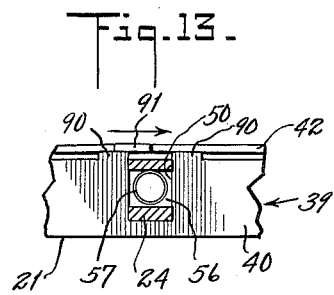
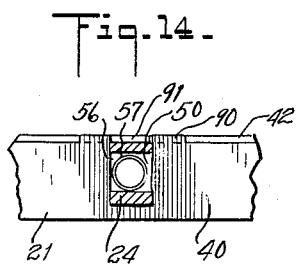
INVENTOR.
JOHN SCHEIB, JR.
BY
his ATTORNEY July 30, 1963  J. SCHEIB, JR  3,099,728
ELECTRICAL MULTIPOLE CONTROL RELAYS
Filed June 11, 1958  5 Sheets-Sheet 2
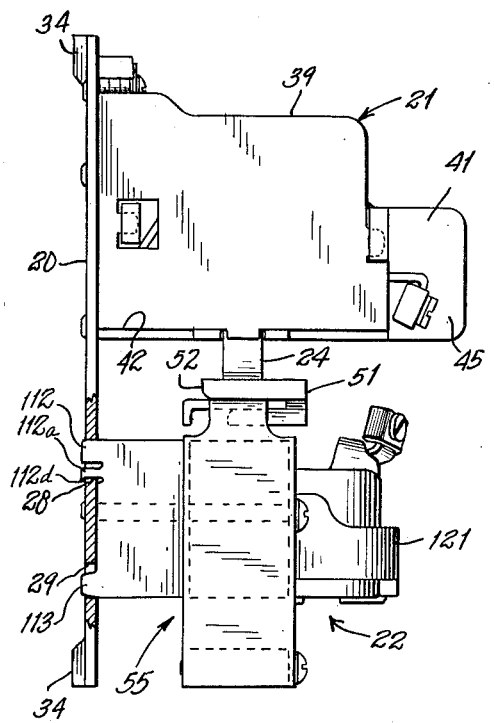
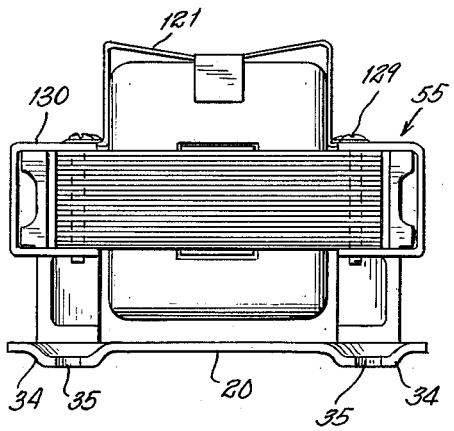
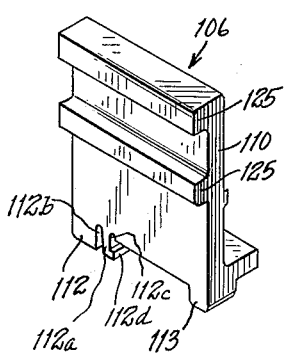
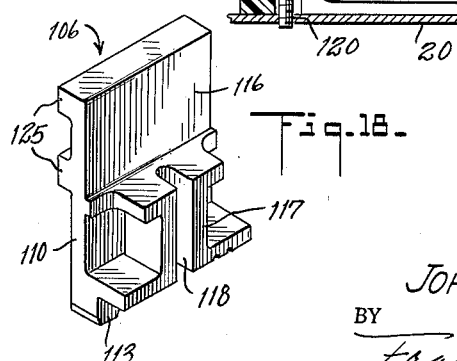
INVENTOR.
JOHN SCHEIB, JR.
BY
Frank C. Bower
his ATTORNEY July 30, 1963 J. SCHEIB, JR 3,099,728
ELECTRICAL MULTIPOLE CONTROL RELAYS
Filed June 11, 1958 5 Sheets-Sheet 3
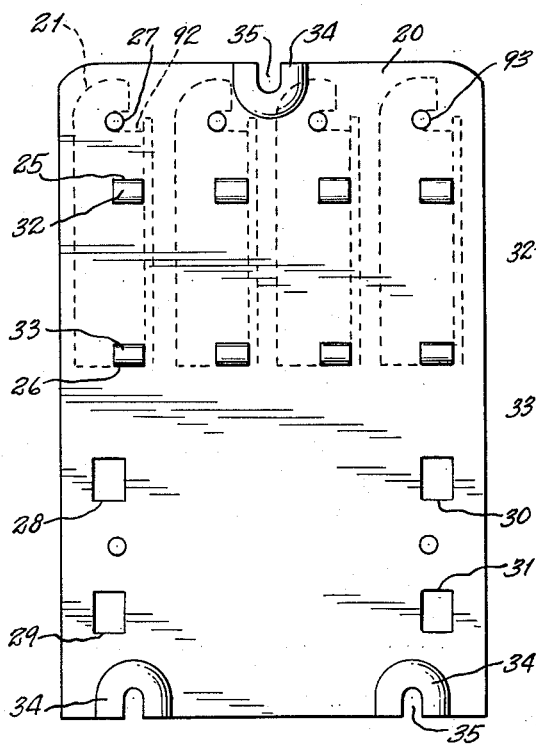
Fig. 3.
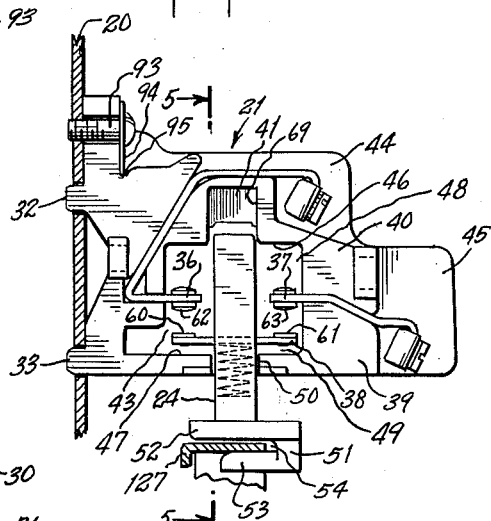
Fig. 4. Fig. 5. Fig. 7.
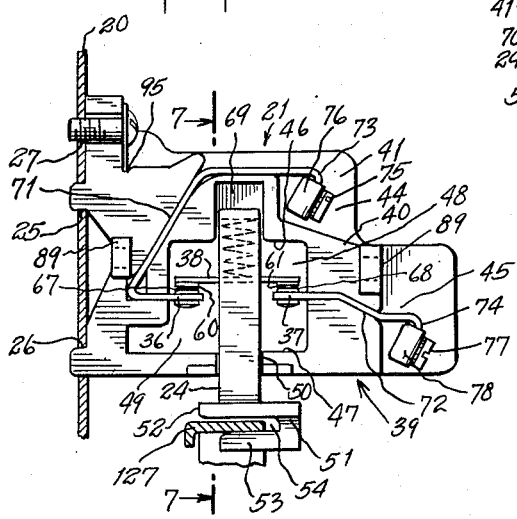
Fig. 6.
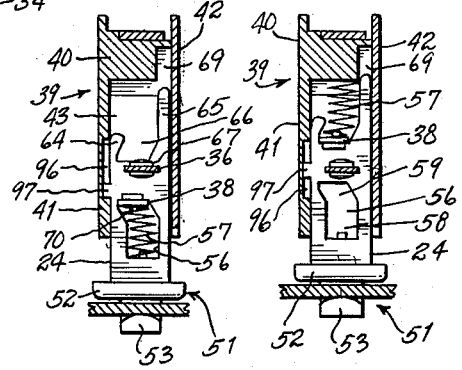
INVENTOR.
JOHN SCHEIB, JR.
BY
Frank G. Bower
his ATTORNEY July 30, 1963     J. SCHEIB, JR     3,099,728
ELECTRICAL MULTIPOLE CONTROL RELAYS
Filed June 11, 1958     5 Sheets-Sheet 4
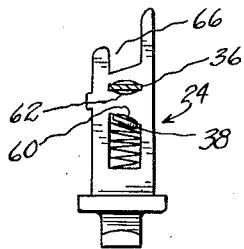
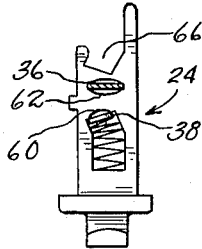
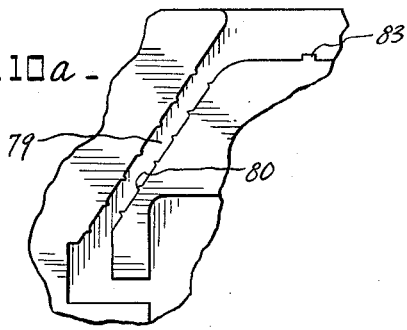
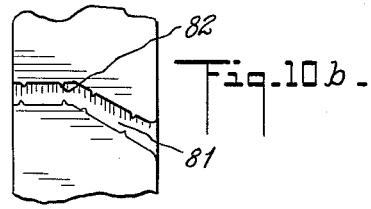
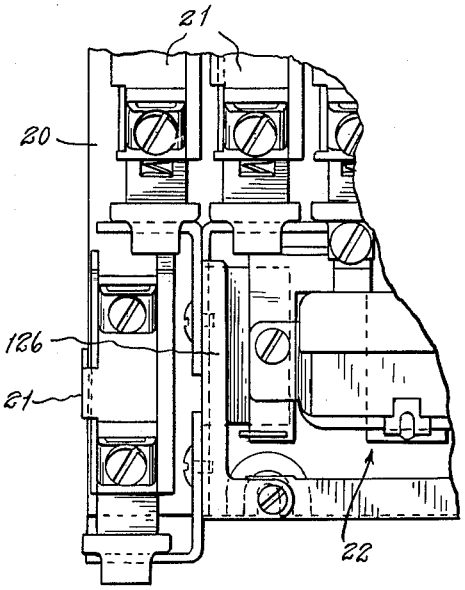
INVENTOR.
JOHN SCHEIB, JR.
BY
his ATTORNEY

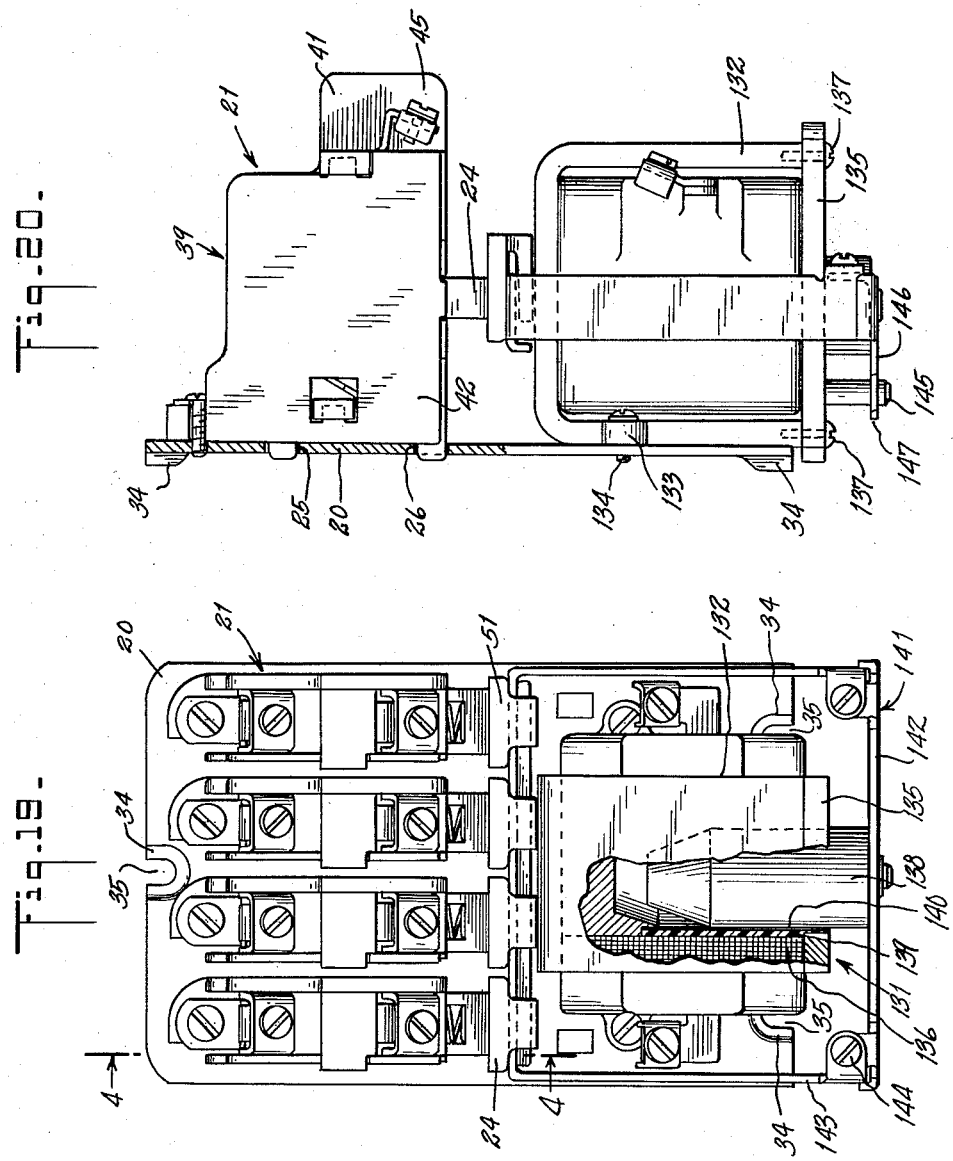

United States Patent Office 3,099,728
Patented July 30, 1963

3,099,728
ELECTRICAL MULTIPOLE CONTROL RELAYS
John Scheib, Jr., Elmsford, N.Y., assignor to Ward Leonard Electric Co., Mount Vernon, N.Y., a corporation of New York
Filed June 11, 1958, Ser. No. 741,347
12 Claims. (Cl. 200—104)

This invention relates to electrical multipole control relays.

An object of this invention is to provide an electrical multipole control relay that has an improved performance, longer life and high degree of reliability with a reduced cost of manufacture and a reduction in parts.

Another object of the invention is to provide a reliable and inexpensive multipole control relay that is readily adaptable to different sizes and requirements.

Another object of the invention is to provide a reliable and inexpensive multipole control relay that may be easily assembled and the components of which may be easily replaced.

Other and further objects of the invention will become apparent from the following description taken in connection with the drawings in which:

FIGS. 1, 2 and 3 are front, side and rear views of a four-pole control relay with an alternating current operated electromagnet.

FIG. 4 is a side view of a contact member with the side cover plate removed to illustrate the contact carrier in a down or de-energized position.

FIG. 5 is a sectional view of the contact member illustrating the contact carrier.

FIG. 6 is a side view of a contact member with the side cover plate removed to illustrate the contact carrier with the contact bar in the upper slot and the contact carrier in the down or de-energized position.

FIG. 7 is a sectional view of the contact member taken along lines 7—7 of FIG. 6 and illustrating the contact carrier.

FIG. 8 is a side view of a modified contact carrier which produces a rolling action between the contact buttons of the movable contact bar and the stationary contact bar.

FIG. 9 is a side view of a modified contact carrier which produces both a rolling and a wiping action between the contact buttons of the movable contact bar and the stationary contact bar.

FIGS. 10a and 10b are enlarged fragmentary views of the contact members illustrating the grooves which retain the connecting strips.

FIGS. 11 and 12 illustrate the positioning and locking of the side cover plate on the contact member.

FIG. 13 is a fragmentary bottom view of the contact member illustrated in FIG. 11 and a sectional view of the contact carrier taken along lines 13—13 of FIG. 11.

FIG. 14 is a fragmentary bottom view of the contact member illustrated in FIG. 12 and a sectional view of the contact carrier taken along lines 14—14 of FIG. 12.

FIG. 15 is a lower end view of the mounting of an alternating current operated electromagnet.

FIG. 16 is a sectional view of the alternating current operated electromagnet and the mounting means taken along lines 16—16 of FIG. 1.

FIGS. 17, 18 are perspective views of the mounting brackets for the alternating current operated electromagnet.

FIGS. 19 and 20 are front and side views of a four-pole control relay with a direct current operated electromagnet.

FIG. 21 illustrates a fragmentary front view of a relay having eight contact members.

The multipole contact relay is formed into three static components comprising a sheet steel mounting plate 20, a number of separate contact members 21 separately mounted to the mounting plate in a row along the upper portion thereof and an electromagnet 22 secured to the lower portion of the mounting plate. The contact members 21 and the electromagnet 22 are dynamically coupled by a movable armature 23 riding on the mounting for the electromagnet and by contact carriers 24 slideably mounted in respective contact members 21 and coupled to the armature to move in or out of engagement with the contacts of the contact head on energization of the electromagnet.

The upper portion of the mounting panel has two rows of rectangular slots 25, 26 vertically paired for receiving mounting projections on the contact members. The paired slots are evenly spaced across the width of the panel to evenly space the contact heads. Each pair of slots has an associated threaded opening positioned above a respective pair of slots and laterally aligned in a row. The contact members 21 have projections 32, 33 snugly fitting in the openings, and a captive bolt for accurately positioning and securely fastening the contact members on the mounting panel. In the lower portion of the panel two pairs of slots are positioned adjacent opposite side edges of the panel with the slots 28, 29 and 30, 31 of each pair vertically arranged. The slots preferably have a rectangular shape forming square corners and edges. The means for mounting the electromagnet on the panel have projections snugly fitting in the slots to hold the mounting means in position during assembly and to support the electromagnetic unit. Mounting bosses 34 are provided in the upper and lower edges of the panel and have slots 35 for passing mounting bolts to secure the mounting panel to a supporting means (not shown).

Each of the contact members 21 is individually mounted to the mounting plate 20 and carries spaced fixed contacts 36, 37 which are connected by a bridging bar or movable contact bar 38 carried by the contact carrier 24 to complete the circuit through the contact member. The contact members may be individually removed from the mounting plate and the contact carrier may be individually disconnected from the armature without affecting the connection of the other contact carriers. The contact members 21 comprise a molded pole housing 39 having a body portion 40 and a side portion 41 formed as a single piece. The side cover plate 42 on the opposite side from that of the molded side piece is removably mounted on the body portion to enclose the chamber 43 in the body portion containing the spaced fixed contacts and to form recesses 44, 45 for the exterior terminal of one of the fixed contacts. The inner chamber is generally rectangular in shape, with the fixed contacts on opposite sides of the chamber and laterally spaced to provide for the contact carrier. The fixed contacts are positioned intermediate to the upper and lower walls 46, 47, respectively, of the chamber to form spaces 48 and 49 substantially the same size for the movement of the ends of the bridging or movable contact bar 38. The bar may be positioned either above or below the fixed contacts, depending upon the particular type of operation desired. With the bridging bar positioned below the fixed contacts the circuit is opened when the electromagnet is de-energized and closed when it is energized. With the contact bar positioned above the fixed contacts the circuit is closed when the electromagnet is de-energized and opened when it is energized. Thus, either set of conditions may be fulfilled by the contact head, depending upon the particular type of operation desired. The inner wall of the chamber has a longitudinally extending groove 96 adjacent to the contact carrier. The contact carrier has a projection 97 extending normal to the carrier and loosely fitting in the groove. When the contact bar is in the upper space of the chamber in the normally closed position, the projection engages the bottom edge of the groove to retain the contact carrier in the contact member.

The contact carrier has a rectangular cross-sectional shape and extends through a rectangular opening 50 in the bottom wall of the chamber of the body portion connecting the inner chamber with the exterior portion of the relay. The contact carrier 24 has a generally U-shaped jaw member 51 connected to the bottom of the carrier for engaging the armature and comprises a lateral flange 52 and a laterally extending member 53 connected to the flange and forming a space 54 for securing the armature frame 55. The contact carrier has a longitudinally extending opening or slot 56 passing laterally through the contact carrier for slideably carrying the bridging or movable contact bar 38 and for carrying a helical spring 57 urging the contact bar against the upper end of the slot. The slot has an axially extending portion 58 for containing the spring 57 and an end portion 59 at an angle to the axis through which the bridging bar slides. The angle of the end portion 59 imparts a lateral motion to the contact bar so that a sidewise or lateral movement occurs between the movable bar and the fixed contacts as the contact buttons 60, 61 of the movable contact seat on the contact buttons 62, 63 of the fixed contacts. This produces a wiping action between the contacts to maintain them free of oxide deposit and other foreign material. The free end of the spring 57 is held in the slot 56 by a boss 150 on the lower surface of the contact carrier and by the walls 151 of the housing 39. Thus, in either slot the spring is held in place. The boss 150 and the walls 151 center and locate the spring 57 in the respective slots.

The preferred form of the contact carrier is illustrated in FIGS. 5 and 7 and produces a wiping action between the contact buttons. In the contact carrier shown in FIG. 8 the slots in which the movable contact bar rides extend axially throughout so that there is no lateral motion imparted to the movable contact bar. The end surfaces of the slots are at an angle to the longitudinal axis so that as the contact bar engages the fixed contacts 36, 37, the movable contact bar twists and causes the contact buttons to roll in relation to one another. In the contact carrier illustrated in FIG. 9 a combined wiping and rolling action is produced by the movement of the movable contact bar. The grooves in which the contact carrier moves are at an angle to the longitudinal axis to produce the wiping action and the end surfaces are also at an angle to the longitudinal axis to produce the rolling action.

The movable contact bar 38 has square notches in the side edges for preventing lateral movement of the contact and has a loop 70 on the side opposite to the contact buttons through which the end of the helical spring threads to lock the bar and spring 57 together. On the other end, the sides 64, 65 of the contact carrier extend above the intermediate portion of the chamber above the fixed contacts to form an open ended slot 66 to carry the bridging contact and spring. The slot extends at an angle to the longitudinal axis of the contact carrier to produce a transverse or wiping movement of the bridging contact across the upper contact buttons 67, 68 of the fixed contacts as previously described. The outer side 65 of the contact carrier extends to fit in a rectangular slot 69 in the body portion 40 for guiding and stabilizing the movement of the contact carrier. The helical spring 57 fits between the bridging bar 38 and the upper wall 46 of the chamber to provide the proper contact pressure between the buttons of the movable contact and the buttons of the fixed contacts. In this position the movable or bridging contacts moves through the upper space and is out of engagement with the fixed contacts when the solenoid is energized and in engagement when the solenoid is de-energized. This is opposite to that action in which the bridging contact is on the other side of the fixed contacts and in the lower portion of the chamber. Thus, the contact head and contact carrier are readily adapted to fulfill either requirement. With the contact carrier carrying the slot so that the end portion is exterior to the contact head, it can be readily seen for which requirement the contact head is arranged by observing the relay from the front.

The fixed or stationary contacts 36, 37 are formed with connecting strips 71, 72, respectively, fitting in the molded member and extending exterior thereto to form external terminals 73, 74. The external terminals are bent at a slight angle to the vertical to permit the easy connection of the ends of the wires to the terminals. Bolts 75, 77 and clamps 76, 78 are provided for gripping wires connected to the terminals. The connecting strip 72 has an S shape with the fixed contact extending horizontally and the external portion extending horizontally. The interconnecting portion fitting in the slot is at an angle to the horizontal. The connecting strip is bent at an angle and has a thickness in relation to the width of the slot in the molded member to form a tight, secure fitting and embedding of the connecting strip in the molded member. The walls of the slots 79, 81 have V-shaped projections 80, 82 to reduce the width of the slot and provide a snug fit to securely hold the strips.

The fixed contact 36 is formed as a single piece with a U-shaped connecting strip 71. The connecting strip is snugly held by V-shaped projections 80 in the wall of the groove and by a raised portion 83 on the upper surface of the molded member which creates a pressure forcing the fixed contact portion and the exterior horizontal terminal portion slightly apart to place the connecting strip under stress. Thus, the fixed contacts are securely and snugly held in the contact heads without the use of rivets or threaded means.

The external terminal 74 is at a slight angle to the vertical for easy fastening of leads to the terminal and has a bolt 75 and a clamp 76 for securing leads thereto. A side cover plate 42 is removably mounted on the molded member and has tongues or tabs 87 for fitting in slots 88 in the projections 89 on the side of the molded piece. Also, on each side of the hole through which the contact carrier passes are raised portions 90 for receiving and holding a tongue or projection 91 extending from the lower edge of the cover plate to lock the cover plate in position on the side of the contact head. The cover plate is held from sidewise movement and up and down movement, and the edge projection prevents movement parallel to the contact member. The cover plate is locked in position when the contact member is mounted on the panel. The movable contact, fixed contact and the contact carrier may be thus held in place and the current carrying parts isolated by insulating members secured to the body portion without the use of bolts or links.

The rear edge of the contact member has projections extending normal thereto having generally rectangular cross sections to fit in the openings on the steel mounting plate. A slot 92 is provided in the upper portion of the contact member for receiving the mounting bolt 93 extending through the slot. The slot is open on the same side as the chamber 49. This is in the direction of molding of the housing 39. The bolt carries a washer 94 extending laterally to the bolt to fit in a slot or groove 95 in the top of the body portion. When the cover plate is fitted on the molded portion, the mounting bolt and the washer 94 are loosely held on the contact head so that the bolt and washer cannot be removed therefrom without removing the cover plate. The contact member then can be simply mounted on the steel plate by fitting the end projections into the slots and threading the bolt into the opening associated therewith.

The electromagnet 22 is mounted on brackets 106 preferably made of resilient nylon material. The electromagnet comprises a laminated E-shaped core 108 having a coil 109 fitting on the center leg with terminals for the external connection of the coil to a control or actuating circuit. The bracket 106 comprises a laterally extending panel 110 having projections 112, 112a and 113 at one end for fitting in the rectangular slots 28, 29 or 30, 31 along the side edges of the steel plate 20 to locate the bracket in the proper position and to hold it against movement in the steel plate. The projections 112 and 112a fit into the same opening and are spaced by the slot 112b. The slot 112b extends beyond the lower edge of the panel 110, and on the other side of the projection 112a a groove 112c is formed in the edge to give flexibility or resiliency to the projection 112a. The projection 112a has a ridge 112d along the free edge to catch on the side of the mounting plate to hold the bracket in place. The facing sides 116 of the panels 110 of the brackets have pedestals 117 with longitudinally extending slots 118 for passing the mounting bolts 119 therethrough. The E-shaped core 108 rests on the pedestals 117 to space the core from the steel plate 20 and position it in relation to the contact members. The mounting bolts pass through the outer legs of the core and the pedestals to thread in the openings 120 in the mounting plate to securely fasten the core and the brackets to the mounting plate. A U-shaped coil clamp 121 extends over the end of the core in engagement with the end legs to hold the coil on the electromagnet. The E-shaped core 108 is fastened together by rivets 122 and the flanges 123 of the coil clamp 121 have notches 124 to locate the flanges in relation to the holes through the core so that the bolts may be readily fitted through the flanges of the strap, the legs of the core and the pedestals of the bracket. The resilient nylon brackets support the electromagnet on the mounting panel and dampen the sixty-cycle vibration produced by the electromagnet. This type of mounting eliminates the need for vibration insulating grommets to obtain the quiet operation of the relay.

On the outer surfaces of the panels of the brackets 106 rail-like means 125 extent normal to the panel 110 for guiding the armature frame 126 in a linear vertical movement. The armature frame is generally of the U-shape with the opposite side legs having longitudinally extending flanges 128 along each edge for engaging the rail-like means 125 and for holding the armature frame 126 in position on the brackets. The strap 127 across the armature frame fits into the jaw-like members 51 on the contact carriers for actuating the contact carrier in response to the energization or de-energization of the electromagnet. At the other end of the frame 126 are fingers or flanges 130 between which is fitted the armature 23 of the electromagnet. The armature is secured thereto by bolts 129 extending through one flange or finger and threaded in the opposing finger to securely and tightly form the armature 23 and armature frame 126 into an integral piece. The relay is normally positioned vertically with the armature at the bottom so that on de-energization of the electromagnet the armature will drop away from the E-shaped core and pull the frame and contact carriers downward. The end surfaces of the armature are raised above the intermediate surface and are smoothly polished to engage the ends of the outer legs and to space the intermediate portion of the armature from the center leg. This provides an even movement of the contact carriers of each of the contact members.

For operation from a direct current circuit the direct current operated electromagnet 131 may be fastened directly to the mounting plate 20. As illustrated in FIGS. 19 and 20 the electromagnet 131 has a metal frame comprising a U-shaped piece 132 and a strap 135 extending across the opening of the U-shaped piece to hold the coil 136. The U-shaped piece 132 has flanges 133 for fastening the electromagnet to the plate by means of the bolts 134 passing through the flanges and threaded in the mounting plate. The strap is fastened to the ends of the U-shaped piece by bolts 137. The bolts 137 securing the U-shaped piece 132 to the strap are unsymmetrically arranged to prevent the improper asesmbling of the U-shaped piece and the strap. A cylindrically shaped plunger 138 is positioned within the coil 136 to slide in a plastic sleeve 139 which is held in position by the strap 135. At the inner end of the coil is a metallic piece 148 with a truncated conical recess for receiving the conical end of the plunger to complete the magnetic circuit of the flux passing through the U-shaped member, the strap and the plunger. The metallic piece 148 is press-fitted into the U-shaped piece. The sleeve 139 has longitudinally extending flutes 140 circumferentially arranged around the plunger 138 to provide escape passages for the air trapped between the end of the plunger and the metallic piece. Thus, the plunger travels its full amplitude to complete the closing of the contacts in the contact members. The plunger 138 is connected to a rectangular frame 141 comprising a crosspiece riveted to the end of the plunger and a U-shaped piece 143 coupled to the contact carriers in a similar manner as in the previously described embodiment of the alternating current operating relay, and fastened to the crosspiece by bolts 144. A guide means is provided by a nylon pin 145 mounted in the strap and a projection 146 on the crosspiece having an opening 147 fitting around the nylon pin. The sleeve 139 within the coil provides a linear motion to the plunger and frame and the guide means maintains the operation of the frame within the plane of the contact carrier.

The arrangement of the parts renders the relay adaptable for various uses. The electromagnet may be either for alternating current or direct current and is interchangeable on the mounting plate and readily fits the contact carriers of the contact heads. Thus, the same components, except for the electromagnet, may be used either for A.C. or D.C. operation without variation of the location of the contact heads or other parts. Also, the number of contact heads may be varied from two to eight using the same electromagnet, either A.C. or D.C., by merely changing the size of the mounting plate. In the foregoing embodiments the relay with four contact heads is described. However, by using the same components and a larger mounting or base plate, a relay with six or eight contacts may be readily assembled from the same components. In the six-contact relay the six contacts extend across the upper portion of the mounting plate in a manner similar to the four-contact relay. In the eight-contact relay there is a slight modification of the arrangement of the units. Six contacts are provided across the upper portion of the mounting plate and two additional contacts are located on opposite sides of the electromagnet and below the outer and upper two contact heads. The end contact heads in the upper portion and the contact heads on each side of the electromagnet are coupled to the armature in a slightly different fashion from the four intermediate or center contact heads. On the side leg of the armature frame L-shaped members are securely fastened thereto by suitable means, such as bolts. L-shaped members are provided on the upper ends of the legs to engage the contact carriers of the outer contact heads and lower L-shaped members are mounted at the lower end of the flange to extend and connect to the contact carriers of the contact heads at the sides of the electromagnet. Thus, it is seen that the unit is readily adaptable to various circuit capacities without modification of the basic components of the unit or any substantial variation in the means of assembling the relay as a unit. This provides a versatility to the relay in that it may be readily presented for various types of circuitry without any special modifications. This reduces the cost of manufacture and extends the availability of different types of relays without any increase in cost. It also reduces the number of relays required to be kept in stock since the relays may be easily modified, depending on the type requested. This assists in reducing the inventory and thereby a saving in the price of the relay may be realized.

The unit may be assembled with a minimum of hand operations. The parts of the basic components are readily manufactured by automatic processes. In the manufacture of these components the shapes and locations of holes and projections permit an easy and rapid assembly of the relay as a unit. The steel mounting plate may be stamped from a sheet steel with the openings and holes formed in the stamping process. The only subsequent operation is the threading of the openings for the mounting bolts of the contact heads and the electromagnet. The coil of the electromagnet with the terminals is formed by automatic machinery, as are the E-shaped core and the armature. The polishing of the surfaces on the end legs of the core and the armature is a machine operation. The brackets are molded. Thus, the electromagnet and the supporting structure are made by automatic machines and are quickly and easily assembled. One of the mounting brackets is fitted in the mounting plate. The armature frame is fitted on the mounting bracket and then the other mounting bracket is fitted on the mounting plate and in the side of the armature frame to guide the armature frame. The E-shaped core with the coil is set on the brackets. The strap is then positioned over the coil and the long bolts inserted into the aligned holes. Thus, only the two bolts need be threaded in place to securely fasten the electro-magnet on the mounting plate. The armature frame is stamped from sheet steel and the armature fitted between the ends and secured therethrough by the bolts. This requires only two fastening operations, and is accomplished before the frame is fitted onto the rail-like means of the brackets. The contact heads are automatically molded and the fixed contacts stamped so that the only hand operation required is the mounting of the terminal bolts and the fitting of the contact strips in the molded member. The contact carrier is also a molded piece with the bridging contact stamped from sheet brass and the contact buttons secured thereto by machine and fitting with a spring into the carrier. The carrier is then dropped into position in the molded piece. The mounting bolts with the captive washer are then dropped into place and as a final operation the stamped side panel is snapped into place. The only remaining operation is the mounting of the contact head onto the mounting panel with the carriers in locking engagement with the armature frame.

It is thus seen from the foregoing description that a new and improved multipole contact relay is provided which is versatile in its applications and inexpensive to manufacture. It is understood that various modifications may be made in the relay without departing from the scope of the invention as set forth in the appended claims.

I claim:

1. An electrical multipole contact relay comprising an electromagnet having an E-shaped core with two end legs and a center leg, a coil on the center leg, an armature spanning the open end of said legs for actuating a plurality of contacts, a flat steel plate having a generally rectangular shape, two brackets each having a panel extending normal to said plate, pedestals on each bracket formed as a single piece therewith and having a supporting surface normal to said panels for receiving the E-shaped core for spacing said electromagnet from said plate, said brackets having second surfaces facing one another in spaced relation with said supporting surfaces therebetween, fastening means extending through a respective end leg and a respective pedestal to thread into said plate for securing said core and brackets to said plate.

2. An electrical multiple contact relay comprising a mounting plate, a row of separate contact members separately secured to the plate, an electromagnet separately secured to the plate below the contact members, each contact member having a movable contact plunger, said electromagnet having an armature connected to said plungers, said plungers having a horizontal flange exterior to said contact members and a horizontal member spaced from the flange and connected thereto to form a space, said armature having a U-shaped frame with a horizontal cross member fitting into said spaces to couple said armature and said plungers, said spaced horizontal member engaging said electromagnet on de-energization to cushion the drop-out of the plunger.

3. An electrical multiple contact relay comprising a mounting plate, a row of separate contact members separately secured to the plate, an electromagnet having mounting means at each end of the electromagnet for securing said electromagnet to said plate separately from said contact members, each of said contact members having a movable contact plunger with a movable contact thereon and said electromagnet having an armature connected to said plungers in said contact members to actuate said plungers on energization of said electromagnet, said mounting means having panels extending normal to said plate and on each side of said electromagnet for holding said electromagnet and having rail-like means on the opposite sides of the panels from the electromagnet for guiding the armature, said armature comprising a generally rectangular shaped frame extending around the electromagnet and having side pieces for engaging said mounting means to guide said frame in a linear movement to and from said contact members, and said frame having a crosspiece between said side pieces for mounting a plurality of separate contact carriers and supporting members mounted on said side pieces for actuating plungers of additional contact members.

4. An electrical multipole contact relay comprising a mounting plate, a row of separate contact members separately secured to the plate, an electromagnet having mounting means at each end of the electromagnet for securing said electromagnet to said plate separately from said contact members, each of said contact members having a movable contact plunger with a movable contact thereon and said electromagnet having an armature connected to said plungers in said contact members to actuate said plungers on energization of said electromagnet, said armature comprising an electromagnetic plunger extending within the electromagnet and a generally rectangular frame, said frame having side pieces and crosspieces, said crosspieces coupled to said plungers of said contact member and said electromagnetic plunger respectively, a fluted guide with multiple passages within said electromagnet for guiding said plunger and said frame in a vertical movement and having longitudinally extending flutes for permitting the escape of entrapped air so that the plunger and armature have a low resistance to the actuation of said electromagnet.

5. A contact member comprising a single molded insulating piece having a body portion and a side portion for housing the actuating and electrical transferring members, said body portion having an opening and said side portion enclosing one side of said opening, means for securing and rigidly mounting said insulating piece on a panel, grooves in said body portion extending inwardly into the central portion of said opening, laterally spaced fixed contacts fitting in said grooves and extending into the central portion of said opening, a contact carrier slideably mounted in said piece and guided on three sides by said body portion and said side portion to move vertically between said fixed contacts and extend through the bottom of said body portion, a movable contact extending laterally to said contact carrier for engaging said fixed contacts, and a side cover plate detachably mounted on said molded piece independent of said mounting means on the opposite side to said side portion to guide said contact carrier and permit the removal of said contact carrier on removal of said piece.

6. A contact member comprising a single molded insulating piece having a chamber closed on one side and open on the other side and having a top wall, a bottom wall and two end walls, fixed contacts rigidly mounted in said insulating piece and laterally spaced on opposite sides of said chamber, said contacts being intermediately positioned to provide in said chamber upper and lower spaces, a three-sided opening in said bottom wall for receiving a contact carrier extending therethrough into said chamber, a contact carrier having a lower slot extending laterally through said contact carrier and an upper slot extending laterally through said contact carrier, a contact bar mountable either in the upper or the lower slot and having resilient means urging said contact bar into engagement with said fixed contacts.

7. A contact member comprising a single molded insulating piece having a chamber closed on one side and open on the other side and having a top wall and a bottom wall and two end walls, fixed contacts positioned on opposite sides of said chamber, said bottom wall having a three-sided opening therein for receiving a contact carrier, a vertically extending slot positioned above said opening and extending above said top wall, a contact carrier having a slot extending laterally through said contact carrier and extending axially along said contact carrier, a contact bar resiliently held within said slot, and said contact carrier extending through said opening and positioned between said fixed contact buttons and having a portion extending into said vertical slot for guiding said contact bar in a vertical movement to resiliently engage said fixed contacts.

8. A contact member comprising a single molded insulating piece having a chamber closed on one side and open on the other side, said chamber having a top wall, a bottom wall and two end walls, fixed contacts rigidly mounted in and extending from the end walls, said contacts being laterally spaced on opposite sides of said chamber and intermediately positioned to provide upper and lower spaces in said chamber between said top wall and said bottom wall, respectively, an opening in said bottom wall for receiving a contact carrier extending therethrough into said chamber, a contact carrier having a lower slot extending laterally through said carrier, said lower slot having an upper and a lower end for retaining a contact bar extending laterally through said slot for engagement with said fixed contacts and for retaining a resilient member for pressing a contact bar into engagement with said fixed contacts, said contact carrier having an upper slot extending laterally through said carrier, said slot having an end surface adjacent to said fixed contacts for receiving the contact bar in a non-engaging position and open at the other end, a resilient member extending through the open end of said slot to engage said top wall for resiliently pressing a contact bar against the fixed contacts in the extended position of said resilient member thereby providing two different contacting actions.

9. A contact member as set forth in claim 6 wherein a plate and mounting means are provided on the side of the contact member, said mounting means comprising spaced projections on the sides of and normal to said insulating piece and having laterally extending slots for receiving tabs on said plate, said spaced tabs on said plate extending in the plane thereof and fitting into said slots of said spaced projections to lock said plate against movement on the side of said contact member.

10. Mounting means for a single pole contact member having a narrow width comprising a mounting plate having spaced rectangular openings and a threaded opening aligned therewith and spaced projections on the contact member fitting snugly in said rectangular openings, a flange on said contact member with a bore extending through said flange having one side open and a notch at the base of the flange, a bolt with a washer extending to fit in said notch to hold said bolt on said contact member in a non-mounting position and said bolt threaded into said threaded opening to securely fasten said contact member in the mounted position.

11. An electrical multipole contact relay as set forth in claim 1 wherein rail-like means are provided on said brackets on the opposite side of a respective bracket from said second surface to face in opposite directions and provide linear guides for the movement of said armature.

12. An electromagnetic multipole contact relay as set forth in claim 11 wherein said linearly guided armature has a crosspiece extending normal to the linear movement and a plurality of separately mountable contactor heads are provided, each separately and individually mounted on said plate above said electromagnet and having plungers with spaced members forming an opening facing the plate to couple said plungers with said armature by a movement toward said plate.

References Cited in the file of this patent

UNITED STATES PATENTS

| | | |
|---|---|---|
| 1,853,964 | Dorgeloh et al. | Apr. 12, 1932 |
| 2,059,702 | Matthias | Nov. 3, 1936 |
| 2,064,632 | Schmitt | Dec. 15, 1936 |
| 2,276,698 | Pierce | Mar. 17, 1942 |
| 2,616,010 | Scheib | Oct. 28, 1952 |
| 2,758,169 | Weide | Aug. 7, 1956 |
| 2,811,617 | Townsend | Oct. 29, 1957 |
| 2,874,245 | Moyer | Feb. 17, 1959 |
| 2,879,359 | Pearson | Mar. 24, 1959 |
| 2,921,166 | Few et al. | Jan. 12, 1960 |